US012791828B2

(12) United States Patent

Moriyoshi et al.

(10) Patent No.: US 12,791,828 B2

(45) Date of Patent: Nov. 10, 2026

(54) LENS APPARATUS AND IMAGE PICKUP APPARATUS

(71) Applicant: CANON KABUSHIKI KAISHA, Tokyo (JP)

(72) Inventors: Akino Moriyoshi, Tochigi (JP); Masayasu Mizushima, Tochigi (JP); Yuichiro Kato, Tochigi (JP); Toshimune Nagano, Saitama (JP); Toru Matsumoto, Tochigi (JP); Takami Hirasawa, Tochigi (JP); Hiroki Osaka, Tochigi (JP); Yoshiki Saji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 339 days.

(21) Appl. No.: 18/609,166

(22) Filed: Mar. 19, 2024

(65) Prior Publication Data

US 2024/0361569 A1 Oct. 31, 2024

(30) Foreign Application Priority Data

Apr. 25, 2023 (JP) ................................. 2023-071260

(51) Int. Cl.

| | |
|---|---|
| ***G02B 7/10*** | (2021.01) |
| ***G03B 3/00*** | (2021.01) |
| *G03B 17/14* | (2021.01) |
| *H04N 23/58* | (2023.01) |
| *H04N 23/663* | (2023.01) |

(52) U.S. Cl.

CPC ............... *G02B 7/102* (2013.01); *G03B 3/00* (2013.01); *G03B 17/14* (2013.01); *H04N 23/58* (2023.01); *H04N 23/663* (2023.01)

(58) Field of Classification Search

CPC .... G02B 7/102; G02B 27/0075; G03B 17/14; G03B 3/00; G03B 2205/0015; G03B 2205/0046; G03B 2205/00; H04N 23/67; H04N 23/58; H04N 23/959; H04N 23/663

See application file for complete search history.

(56) References Cited

U.S. PATENT DOCUMENTS

| | | | | |
|---|---|---|---|---|
| 9,313,404 | B2 * | 4/2016 | Hideshima | G03B 5/00 |
| 10,200,596 | B1 * | 2/2019 | Silverstein | G02B 27/646 |
| 11,606,539 | B1 * | 3/2023 | Saito | G03B 5/06 |
| 2012/0169902 | A1 * | 7/2012 | Matsuzawa | H04N 23/61 348/333.04 |

(Continued)

FOREIGN PATENT DOCUMENTS

| | | | |
|---|---|---|---|
| JP | H06342179 A | | 12/1994 |
| JP | 2006078756 A | * | 3/2006 |
| JP | 2017220864 A | | 12/2017 |

(Continued)

*Primary Examiner* — Christopher E Mahoney

(74) *Attorney, Agent, or Firm* — ROSSI, KIMMS & McDOWELL LLP

(57) ABSTRACT

A lens apparatus includes an optical system including an optical member configured to widen or narrow an in-focus range by moving the optical member, and a processor configured to determine a relationship between a moving direction of the optical member and widening or narrowing of the in-focus range, and to set information regarding a movement of the optical member using a determination result.

10 Claims, 7 Drawing Sheets

(56) References Cited

U.S. PATENT DOCUMENTS

| | | | | |
|---|---|---|---|---|
| 2019/0199912 | A1* | 6/2019 | Nagano | H04N 23/67 |
| 2022/0272274 | A1* | 8/2022 | Sato | G06T 7/70 |

FOREIGN PATENT DOCUMENTS

| | | | | |
|---|---|---|---|---|
| JP | 2019007993 | A | | 1/2019 |
| JP | 2019159019 | A | * | 9/2019 |
| JP | 2021128293 | A | | 9/2021 |

* cited by examiner

LENS APPARATUS AND IMAGE PICKUP APPARATUS

BACKGROUND

Technical Field

One of the aspects of the embodiments relates to a lens apparatus and an image pickup apparatus.

Description of Related Art

Lens barrels have conventionally been proposed that enable tilt imaging that adjusts an in-focus range, and shift imaging that changes an imaging angle of view and corrects distortion. Tilt imaging can tilt a focal plane so as to entirely or partially focus on an object plane that is tilted from a plane perpendicular to the optical axis of the imaging optical system. Japanese Patent Laid-Open No. 2019-7993 discloses an image pickup apparatus configured to superimpose and display an in-focus range on an image so that the in-focus range can be easily visually recognized in a case where the object plane is partially in focus.

In the configuration of Japanese Patent Laid-Open No. 2019-7993, in creating an image by widening or narrowing the in-focus range after the focal plane is tilted, the in-focus range is to be changed by changing the current tilt of the focal plane. However, the user has difficulty in intuitively understanding how to move the imaging optical system in order to change the in-focus range, and thus is to move once the optical system to confirm a change in the in-focus range and then change the in-focus range into a desired in-focus range.

SUMMARY

A lens apparatus according to one aspect of the disclosure includes an optical system including an optical member configured to widen or narrow an in-focus range by moving the optical member, and a processor configured to determine a relationship between a moving direction of the optical member and widening or narrowing of the in-focus range, and to set information regarding a movement of the optical member using a determination result.

An image pickup apparatus according to another aspect of the disclosure includes a processor configured to determine a relationship between a moving direction of an optical member configured to widen or narrow an in-focus range by moving the optical member and widening or narrowing of the in-focus range, and to set information regarding a movement of the optical member using a determination result, and an image sensor configured to capture an object image.

Further features of various embodiments of the disclosure will become apparent from the following description of embodiments with reference to the attached drawings.

DESCRIPTION OF THE EMBODIMENTS

Figure 1:
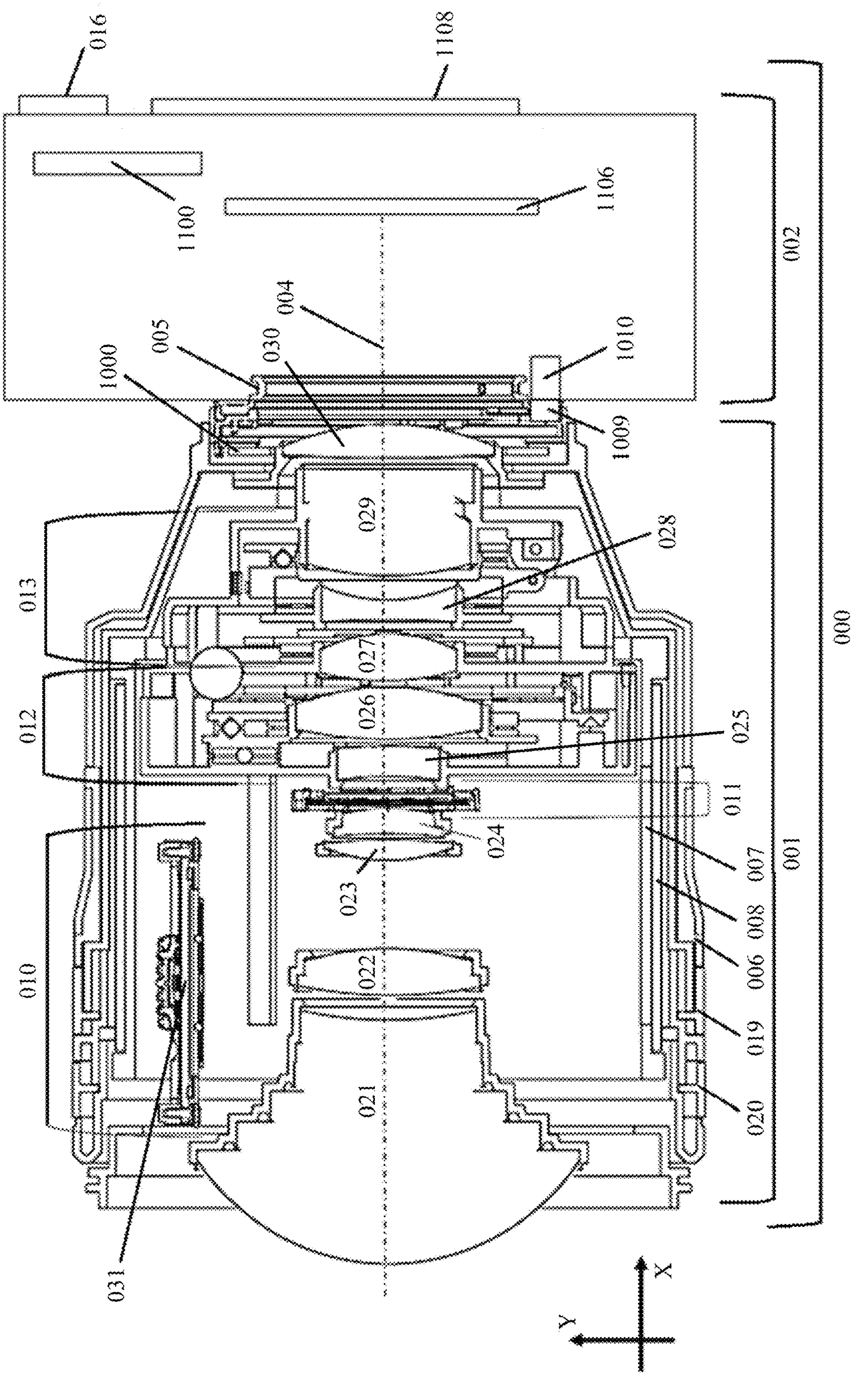
FIG. 1 is a configuration diagram of a camera system according to a first embodiment.

In the following, the term “unit” may refer to a software context, a hardware context, or a combination of software and hardware contexts. In the software context, the term “unit” refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term “unit” refers to a hardware element, a circuit, an assembly, a physical structure, a system, a module, or a subsystem. Depending on the specific embodiment, the term “unit” may include mechanical, optical, or electrical components, or any combination of them. The term “unit” may include active (e.g., transistors) or passive (e.g., capacitor) components. The term “unit” may include semiconductor devices having a substrate and other layers of materials having various concentrations of conductivity. It may include a CPU or a programmable processor that can execute a program stored in a memory to perform specified functions. The term “unit” may include logic elements (e.g., AND, OR) implemented by transistor circuits or any other switching circuits. In the combination of software and hardware contexts, the term “unit” or “circuit” refers to any combination of the software and hardware contexts as described above. In addition, the term “element,” “assembly,” “component,” or “device” may also refer to “circuit” with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a configuration diagram of a camera system 000 according to this embodiment. The camera system 000 includes a lens barrel (lens apparatus) 001 and a camera body (image pickup apparatus) 002. The lens barrel 001 is attached to the camera body 002 via a mount 005 and an unillustrated mount of the camera body 002. Although the lens barrel 001 is attachable to and detachable from the camera body 002 in this embodiment, it may be integrated with the camera body 002.

The camera body 002 includes a viewfinder 016, an imaging unit 1106, a display unit 1108, and a camera CPU 1100. The user can confirm a captured image and input a line of sight (visual line) by looking into the viewfinder 016. The display unit 1108 can use liquid crystal or organic EL technology and is used to display a captured image and change various settings of the camera system 000. Controlling an unillustrated shutter by the camera CPU 1100 can expose an image sensor provided in the imaging unit 1106 to light for an arbitrary period in order to perform imaging.

The lens barrel 001 includes an optical system that includes a plurality of lenses. The plurality of lenses consist of a first lens 021, a second lens 022, a third lens 023, a fourth lens 024, a fifth lens 025, a sixth lens 026, a seventh lens 027, an eighth lens 028, a ninth lens 029, and a tenth lens 030. The lens barrel 001 further includes a mount 005, a zoom operation ring 006, a guide barrel 007, a cam barrel 008, an aperture mechanism 011, a focus operation ring 019, an aperture operation ring 020, a vibration actuator 031, and a lens CPU 1000.

The lens CPU 1000 controls the operation of each component in the lens barrel 001.

The focal length of the lens barrel 001 changes by changing the positional relationship of each lens in a direction parallel to the optical axis 004 of the optical system. Each lens is held by a lens barrel having a cam follower. The cam follower is engaged with both a linear (straightforward) groove parallel to the optical axis 004 of the guide barrel 007 and a groove tilted relative to the optical axis 004 of the cam barrel 008. As the zoom operation ring 006 is rotated, the cam barrel 008 is rotated. In other words, the focal length can be changed by rotating the zoom operation ring 006. The focal length of the optical system can be detected by an unillustrated zoom position detector configured to detect a rotating amount of the zoom operation ring 006.

The second lens 022 is a focus unit that can provide focusing by moving along the optical axis 004. The focus unit 010 includes an unillustrated guide bar that guides the second lens 022 in a direction parallel to the optical axis 004, a vibration actuator 031, and an unillustrated detector configured to detect a moving distance of the second lens 022. The focus unit 010 is driven and controlled by the lens CPU 1000.

By moving the sixth lens 026 and the eighth lens 028 in the direction orthogonal to the optical axis 004, a tilt effect that tilts the focal plane relative to the imaging surface of the image sensor provided in the imaging unit 1106, and a shift effect that moves an imaging range can be obtained. More specifically, in a case where the sixth lens 026 and the eighth lens 028 have the same refractive power (both have positive refractive powers or both have negative refractive powers), they can provide the tilt effect when moved in opposite directions and the shift effect when moved in the same direction. In a case where the sixth lens 026 and the eighth lens 028 have different refractive powers (one has positive refractive power and the other has negative refractive power), they can provide the shift effect when moved in opposite directions and the tilt effect when moved in the same direction. A first shift unit 012 includes a holder configured to hold the sixth lens 026 movably in the direction orthogonal to the optical axis 004, a drive unit, and a detector configured to detect the moving distance of the sixth lens 026. A second shift unit 013 includes a holder configured to hold the eighth lens 028 movably in the direction orthogonal to the optical axis 004, a drive unit, and a detector configured to detect the moving distance of the eighth lens 028. Driving of the first shift unit 012 and the second shift unit 013 is controlled by the lens CPU 1000.

The aperture mechanism 011 changes the aperture diameter of the optical system in accordance with an instruction from the lens CPU 1000.

Figure 2:
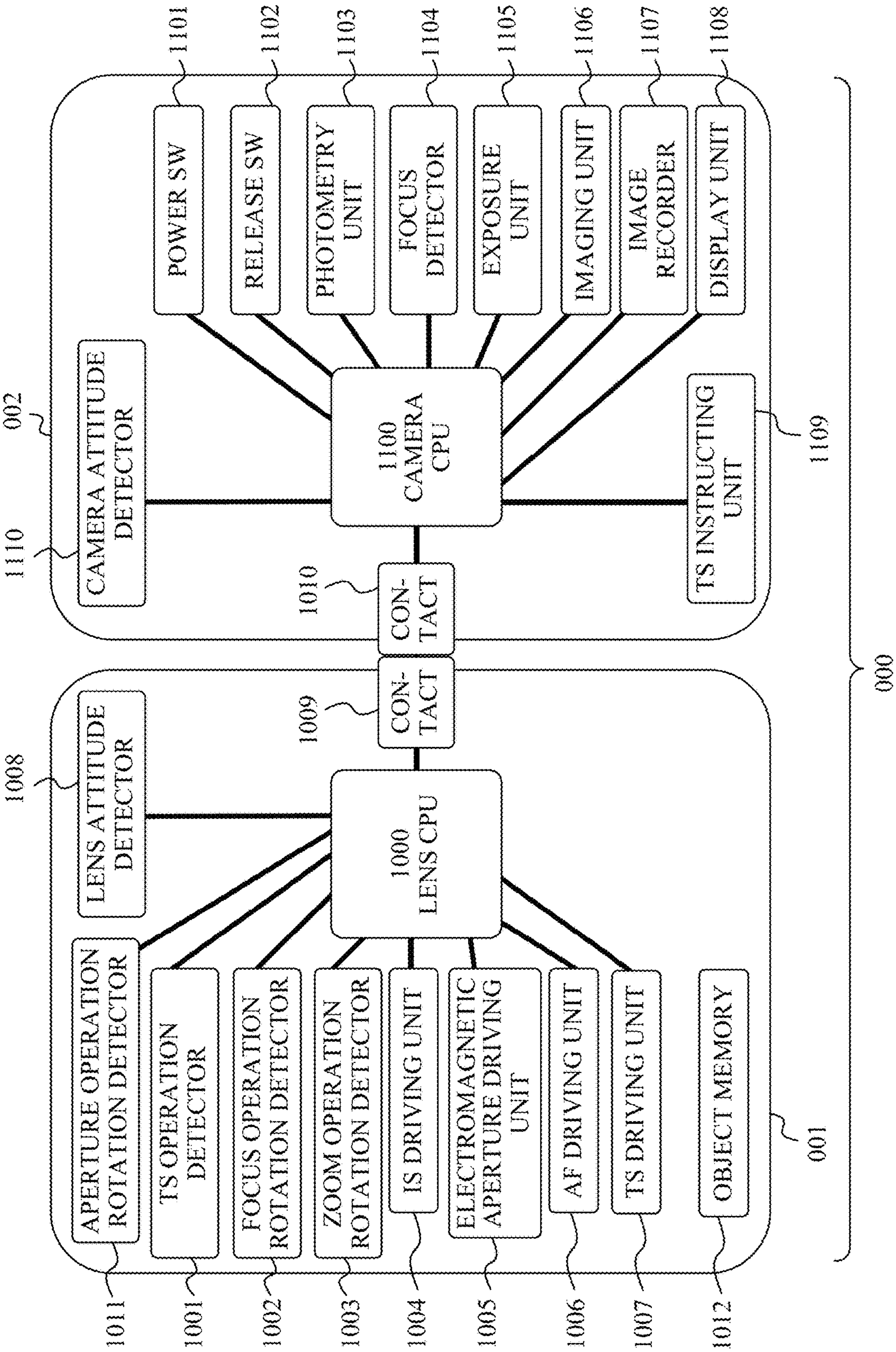
FIG. 2 is an electrical configuration diagram of the camera system.

FIG. 2 is an electrical configuration diagram of the camera system 000. A description will now be given of the control flow inside camera body 002. The camera CPU 1100 includes a microcomputer and controls the operation of each component in the camera body 002. In a case where the lens barrel 001 is attached, the camera CPU 1100 communicates with the lens CPU 1000 via a lens-side electrical contact 1009 and a camera-side electrical contact 1010. The lens-side electrical contact 1009 and the camera-side electrical contact 1010 include contacts for supplying power from the camera body 002 to the lens barrel 001.

Information (signal) that the camera CPU 1100 transmits to the lens CPU 1000 includes drive amount information and focus shift information about the second lens 022, attitude information about the camera body 002 based on a signal from a camera attitude detector 1110 such as an unillustrated acceleration sensor, object distance information about an object based on a signal from a tilt/shift (TS) instructing unit 1109 that instructs a desired object to be focused on by the photographer, focus shift information, imaging range information that instructs the desired imaging range (field of view), etc.

Information (signal) transmitted from the lens CPU 1000 to the camera CPU 1100 includes optical information such as imaging magnification, functional information such as zoom and image stabilization mounted on the lens barrel 001, and attitude information from a lens attitude detector 1008 such as a gyro sensor or an acceleration sensor.

A power switch 1101 is operable by the photographer and used to start the camera CPU 1100 and start supplying power to each actuator, sensor, etc. in the camera system 000. A release switch 1102 is operable by the photographer and includes a first stroke switch SW1 and a second stroke switch SW2. A signal from the release switch 1102 is input to the camera CPU 1100. The camera CPU 1100 enters an imaging preparation state according to the input of the turning-on signal from the first stroke switch SW1. In the imaging preparation state, a photometry unit 1103 measures the object luminance, and a focus detector 1104 performs focus detection.

The camera CPU 1100 calculates the aperture value (F-number) of the aperture mechanism 011, the exposure amount (shutter time) of the imaging unit 1106, etc. based on the photometry result by the photometry unit 1103. The camera CPU 1100 determines the driving amount (including the driving direction) of the second lens 022 based on the focus information (defocus amount and defocus direction) as the detection result of the focus state of the optical system by the focus detector 1104. Information regarding the driving amount of the second lens 022 is transmitted to the lens CPU 1000.

As described above, this embodiment provides the tilt effect that tilts the focal plane relative to the imaging plane and the shift effect that moves the imaging range by moving the sixth lens 026 and the eighth lens 028 in the direction orthogonal to the optical axis 004. The camera CPU 1100 calculates a tilt driving amount for focusing on a desired object instructed by the TS instructing unit 1109. The camera CPU 1100 calculates a shift driving amount for changing the current imaging range to the imaging range instructed by the TS instructing unit 1109. Information on these driving amounts is transmitted from the camera CPU

1100 to the lens CPU 1000, and the driving of the sixth lens 026 and the eighth lens 028 is controlled.

The number of objects instructed by the TS instructing unit 1109 may be plural. Even if the objects are at different distances, they can be focused on if they are on a tilted object plane by the tilt effect.

While the TS instructing unit 1109 is provided in the camera body 002, it may be provided in the lens barrel 001. The function of the TS instructing unit 1109 may be assigned to an existing rotary operation unit, button, switch, etc. of the lens barrel 001 or the camera body 002.

In a case where the camera CPU 1100 enters a predetermined imaging mode, it starts eccentric driving of (decentering) an unillustrated image stabilizing lens, that is, controls the image stabilizing operation. In a case where the lens barrel 001 does not have the image stabilizing function, eccentric driving (decentering) control of the image stabilizing lens is not required.

In a case where the turning-on signal from the second stroke switch SW2 is input, the camera CPU 1100 transmits an aperture driving command to the lens CPU 1000, and sets the aperture mechanism 011 to a pre-calculated aperture value. The camera CPU 1100 sends an exposure start command to the exposure unit 1105, and performs a retraction operation of an unillustrated mirror (this operation does not occur if the camera body 002 is a mirrorless camera) and an opening operation of an unillustrated shutter to cause the image sensor provided in the imaging unit 1106 to perform photoelectric conversion of the object image formed on the imaging surface by the optical system, that is, an exposure operation.

The imaging signal from the imaging unit 1106 is digitally converted by a signal processing unit in the camera CPU 1100, receives various correction processing, and is output as an image signal. The image signal (data) is recorded and stored in an image recording unit 1107 on a recording medium such as a semiconductor memory such as a flash memory, a magnetic disk, and an optical disc.

The image captured by the imaging unit 1106 can be displayed on the display unit 1108 during imaging. Images recorded in the image recording unit 1107 can also be displayed. Recently, the display unit 1108 has touch operation technology, which enables the user to select and focus on an object in a live-view image. That is, a configuration in which the TS instructing unit 1109 is included in the display unit 1108 is common.

The control flow inside the lens barrel 001 will be described below.

A focus operation rotation detector 1002 includes the focus operation ring 019 and an unillustrated sensor configured to detect the rotation of the focus operation ring 019.

An aperture operation rotation detector 1011 includes the aperture operation ring 020 and an unillustrated sensor configured to detect the rotation of the aperture operation ring 020.

A zoom operation rotation detector 1003 includes the zoom operation ring 006 and an unillustrated sensor configured to detect the rotation of the zoom operation ring 006.

An object memory 1012 stores a spatial position of an object instructed by the TS instructing unit 1109 or the display unit 1108 in the imaging range. The stored position is defined as an object distance and its coordinates (X, Y) with the imaging plane as the XY-axis plane.

A TS operation detector 1001 includes a manual operation unit for obtaining a tilt/shift effect and an unillustrated sensor configured to detect the operation amount of the manual operation unit.

An image stabilization (IS) driving unit 1004 includes a driving actuator for an unillustrated image stabilizing lens configured to provide an image stabilizing operation, and a driving circuit for the driving actuator. In a case where the lens barrel 001 does not have the image stabilizing function, such a configuration is unnecessary.

An autofocus (AF) driving unit 1006 includes the second lens 022 that provides the focusing operation, and the focus unit 010 (ultrasonic motor unit) that moves the second lens 022 along the optical axis 004 according to driving amount information about the second lens 022. The driving amount information may be determined based on the signal from the camera CPU 1100, or may be determined from the signal obtained by operating the focus operation rotation detector 1002 and manually instructing the focus position.

An electromagnetic aperture driving unit 1005 operates the aperture mechanism 011 to an aperture state corresponding to a specified aperture value. The electromagnetic aperture driving unit 1005 operates in the same manner in a case where the photographer specifies a desired aperture value by operating the aperture operation ring 020.

A TS driving unit 1007 provides a tilt operation to obtain a desired object plane (focal plane) and a shift operation to obtain a desired imaging range, using the object distance, position information, and imaging range information acquired from the camera CPU 1100. The lens CPU 1000 controls the TS driving unit 1007 and the AF driving unit 1006 to operate optimally in order to obtain the desired focus state. The lens barrel 001 according to this embodiment has an optical characteristic such that the focus changes even if the object distance does not change due to the shift operation. The TS driving unit 1007 and the AF driving unit 1006 are optimally controlled in accordance with such an optical characteristic.

An unillustrated gyro sensor is disposed and fixed inside the lens barrel 001, and is electrically connected to the lens CPU 1000. The gyro sensor detects the respective angular velocities of vertical shake (in the pitch direction) and lateral shake (in the yaw direction), which are angular shakes of the camera system 000, and outputs the detected values to the lens CPU 1000 as an angular velocity signal. The lens CPU 1000 electrically or mechanically integrates the angular velocity signal in the pitch direction and yaw direction from the gyro sensor, and calculates the shake amount in the pitch direction and the shake amount in the yaw direction, which are displacement amounts in the respective directions (collectively referred to as an angular shake amount).

The lens CPU 1000 controls the IS driving unit 1004 to shift the image stabilizing lens based on the combined displacement amount of the angular shake amount and the parallel shake amount, and correct the angular shake and parallel shake. In a case where the lens barrel 001 has no image stabilizing function, such a configuration is unnecessary. The lens CPU 1000 controls the AF driving unit 1006 based on the focus shake amount to move the second lens 022 along the optical axis to correct focus shake.

The lens CPU 1000 controls the TS driving unit 1007 based on the shake and displacement amount of the lens barrel 001 calculated based on the output from the gyro sensor. For example, in a case where camera shake occurs in the camera system 000 manually held during imaging, the object plane shifts relative to the object. Since the object position is stored in the object memory 1012, the TS driving unit 1007 can be controlled to correct the camera shake and focus the object plane on the object. In order to control the TS driving unit 1007, a signal from an acceleration sensor mounted on the camera body 002 may be used. The acceleration sensor may be mounted on the lens barrel 001.

Figure 3A:
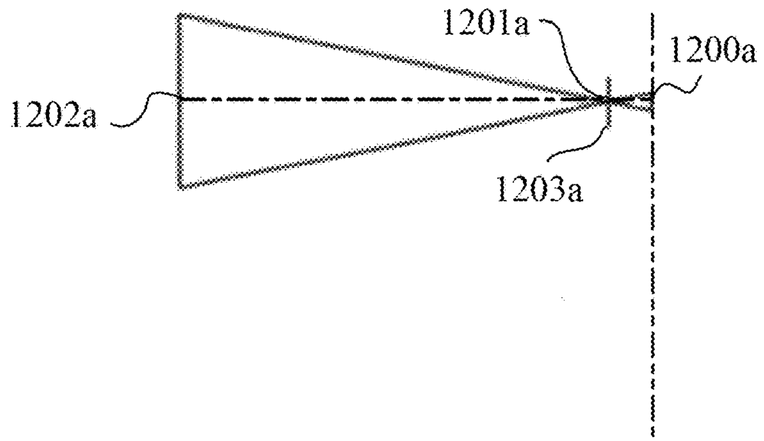
FIGS. 3A, 3B, and 3C explain the Scheimpflug principle.
Figure 3B:
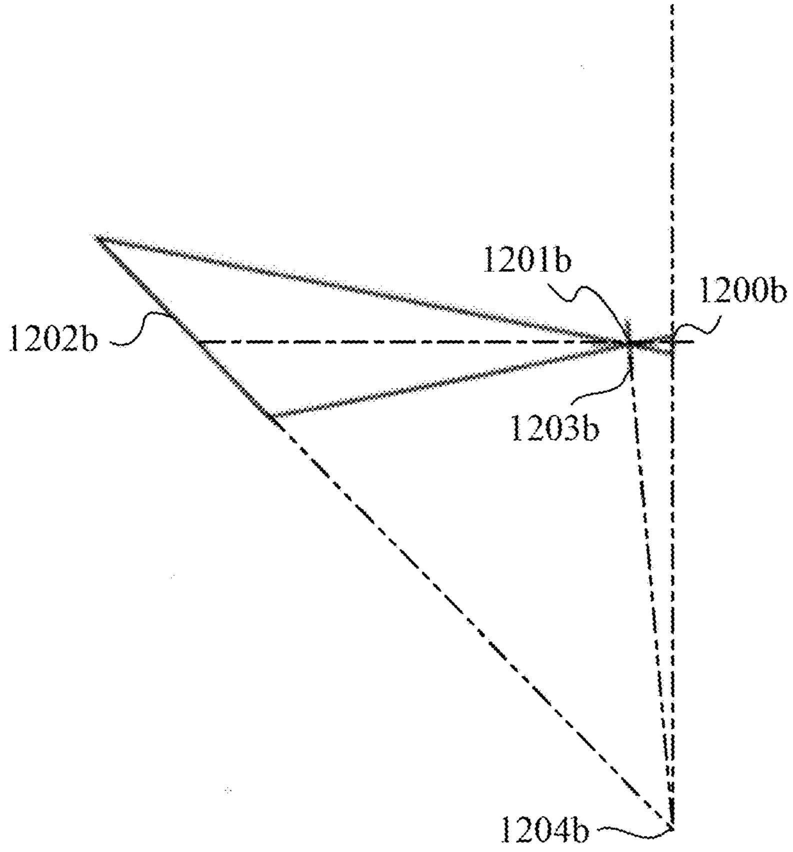
Figure 3C:
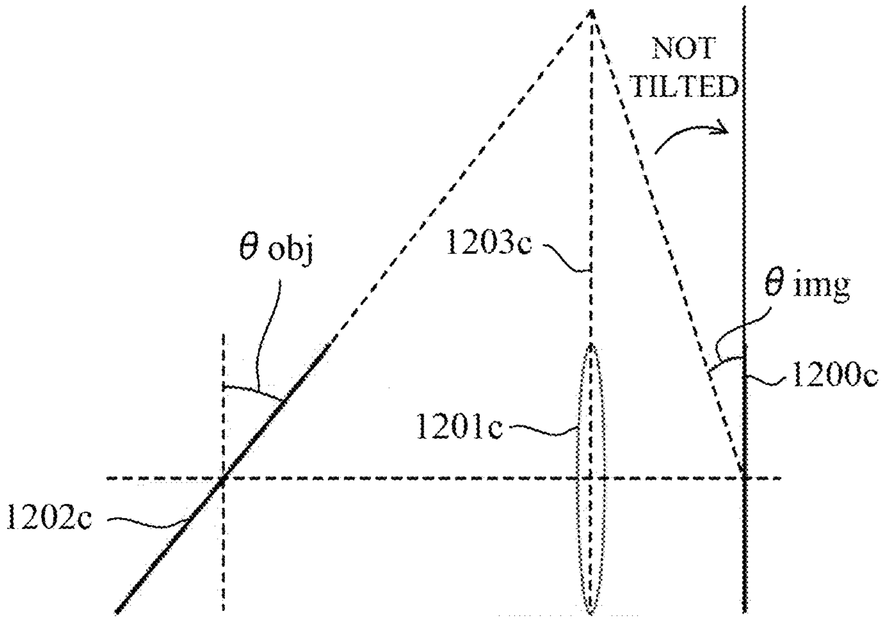

FIGS. 3A to 3C explain the Scheimpflug principle. In a case where the optical axis of the optical system is tilted relative to the imaging plane, the in-focus range on the object side is determined by the Scheimpflug principle. FIG. 3A illustrates an in-focus range in a case where the optical axis of the optical system 1201*a* is not tilted relative to an imaging surface 1200*a*. Reference numerals 1202*a* and 1203*a* are an in-focus object plane and a principal plane of the optical system 1201*a*, respectively. FIG. 3B illustrates an in-focus range in a case where the optical axis of the optical system 1201*b* is tilted relative to the imaging surface 1200*b*. Reference numerals 1202*b* and 1203*b* are an in-focus object plane and a principal plane of the optical system 1201*b*, respectively. The Scheimpflug principle is that, as illustrated in FIG. 3B, in a case where the imaging surface 1200*b* and the principal plane 1203*b* of the optical system 1201*b* intersect at an intersection 1204*b* on straight lines, the object plane 1202*b* also passes through the intersection 1204*b*.

In a case where an object to be imaged has depth, tilting the object plane 1202*b* to follow that depth can focus from the front to the back of the object. In focusing on a depth area using a lens that does not have a tilt mechanism, the common method is to narrow the aperture in the aperture stop to increase the depth of field, but the lens having the tilt mechanism can focus on the depth area even if the aperture is fully opened.

Tilting the principal plane 1203*b* of the optical system 1201*b* in a direction opposite to the tilt of a deep object can make the object plane 1202*b* intersect with the depth direction of the object at an angle close to a right angle. In this case, since the in-focus range can be extremely narrowed, a diorama-like image can be obtained. Alternatively, instead of tilting the optical system, an angle θobj of the object plane 1202*c* may be generated as illustrated in FIG. 3C by using the tilt of the image plane due to the eccentric movements (decentering) of the lenses. In a case where the Scheimpflug principle is applied to the principal plane 1203*c* of the optical system 1201*c* having no tilting and the object plane 1202*c*, the imaging surface 1200*c* is tilted by an angle θimg (image plane tilt). In this case, the angle θimg may be corrected so that the object plane is tilted and the desired object can be in focus without tilting the imaging surface 1200*c*.

On the other hand, in an attempt to secure a predetermined imaging surface tilt correction effect, the eccentrically moving amount of the optical system 1201*c* increases and the composition significantly shifts. Accordingly, another lens designed to reduce aberration fluctuations during the eccentric movement may be moved. This embodiment eccentrically operates the sixth lens 026 and the eighth lens 028, which correspond to the optical system 1201*c*.

A description will now be given of imaging using the tilt effect according to this embodiment. Here, an imaging scene is assumed to be "diorama-style imaging," for imaging a landscape photo like a diorama.

Figure 4:
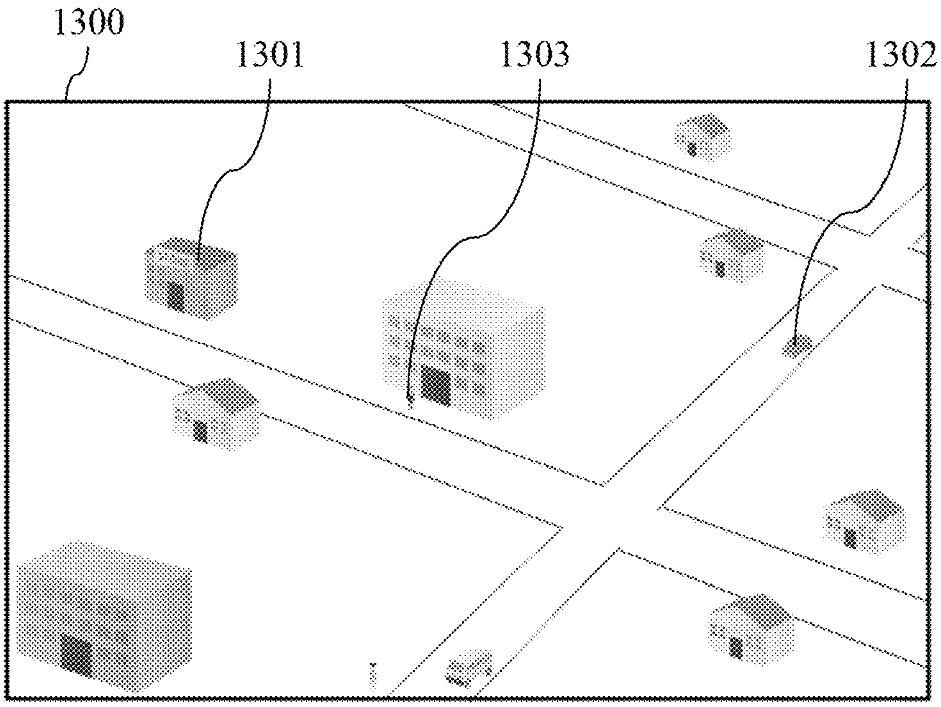
FIG. 4 illustrates an example of an image displayed on the display unit during tilt imaging according to the first embodiment.

FIG. 4 illustrates an example of an image 1300 displayed on the display unit 1108 during tilt imaging. Assume that the display unit 1108 includes the TS instructing unit 1109. Object images 1301, 1302, and 1303 in image 1300 are a building, a car, and a person, respectively. The focal plane is tilted about a predetermined axis as a rotation axis so that only part of the object image displayed on the display unit 1108 is in focus. In changing (widening or narrowing) the width of the in-focus range from the tilted imaging state illustrated in FIG. 4, the tilt of the object plane is to be changed. In that case, the optical system is eccentrically operated.

Figure 5:
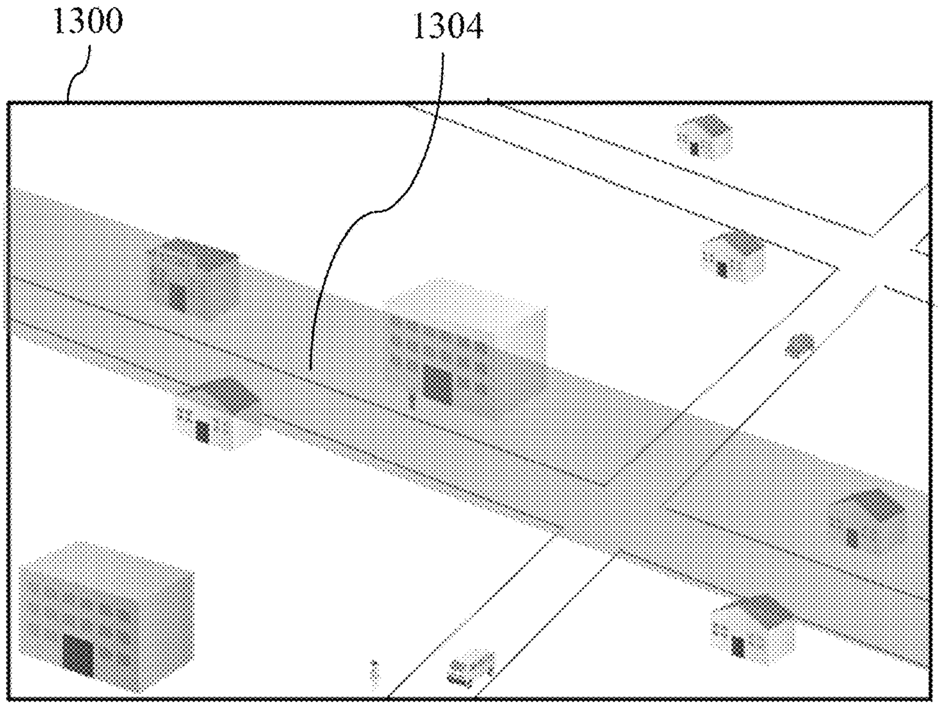
FIG. 5 illustrates an example of an image in which an in-focus range is displayed, which is displayed on a display unit in the first embodiment.

FIG. 5 illustrates an example of an image 1300 displayed on the display unit 1108 in which an in-focus range is displayed, in a mode for widening or narrowing the in-focus range of tilt imaging. In order to visually recognize the current in-focus range, an in-focus range display 1304 is displayed in a semitransparent manner in the in-focus range of the image 1300. Thereby, the in-focus range can be distinguished from the out-of-focus range and displayed. Alternatively, only the in-focus range display 1304 may be displayed transparently with semitransparent display superimposed on the entire image 1300.

The focus detector 1104 generates focus information such as clarity from the image 1300 and performs focus detection of the object images 1301, 1302, 1303, etc. The camera CPU 1100 acquires from the focus detector 1104 the change in clarity of the image 1300 in a case where the sixth lens 026 and the eighth lens 028 are slightly eccentrically moved. Then, using the acquired result, the camera CPU 1100 can determine in which direction the sixth lens 026 and the eighth lens 028 is to be eccentrically moved to widen or narrow the in-focus range. That is, the camera CPU 1100 functions as a determining unit configured to determine a relationship between the moving directions of the sixth lens 026 and the eighth lens 028 and the widening or narrowing of the in-focus range. The camera CPU 1100 can also simultaneously acquire the eccentrically moving amount of the lens necessary for changing the in-focus range. Using the acquired result, the camera CPU 1100 can tag the moving direction and moving amount of the lens with the widening or narrowing instruction and the change amount instructed by the user. That is, the camera CPU 1100 functions as a setting unit configured to set information regarding the movements of the sixth lens 026 and the eighth lens 028. More specifically, the camera CPU 1100 acquires information regarding operations on an in-focus range selector (selector) 1305 and an in-focus range changer (operation unit) 1306, which will be described below. That is, the camera CPU 1100 functions as an acquiring unit configured to acquire information regarding the operation unit. Then, in a case where the widening of the in-focus range is selected by the in-focus range selector 1305, the camera CPU 1100 sets so that the moving directions of the sixth lens 026 and the eighth lens 028 become directions to widen the in-focus range as the in-focus range changer 1306 is operated. In a case where the narrowing of the in-focus range is selected by the in-focus range selector 1305, the camera CPU 1100 sets so that the moving directions of the sixth lens 026 and the eighth lens 028 become directions to narrow the in-focus range as the in-focus range changer 1306 is operated.

In this embodiment, the camera CPU 1100 functions as the determining unit, the setting unit, and the acquiring unit, but the lens CPU 1000 may function as each unit.

Figure 6:
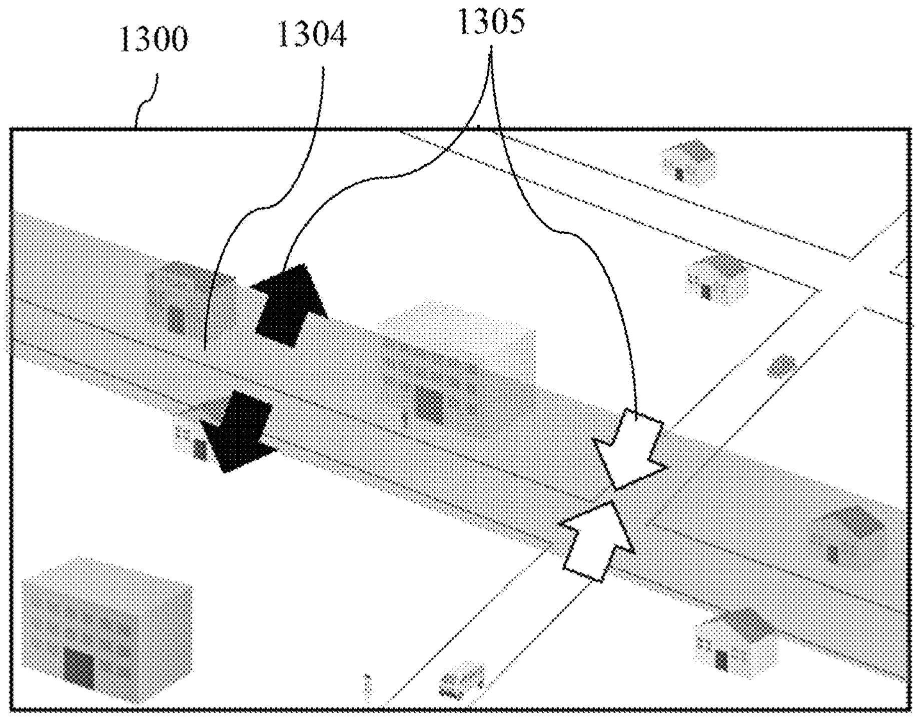
FIG. 6 illustrates an example of an image in which an in-focus range selector according to the first embodiment is displayed.

FIG. 6 illustrates an example of an image 1300 in which the in-focus range selector 1305 is displayed after the determination of the relationship between the moving directions of the sixth lens 026 and the eighth lens 028 and the widening or narrowing of the in-focus range is completed. In the image 1300, two types of in-focus range selectors 1305 are displayed: widening and narrowing of the in-focus range. The in-focus range selector 1305 is associated with the determination result by the camera CPU 1100.

Figure 7:
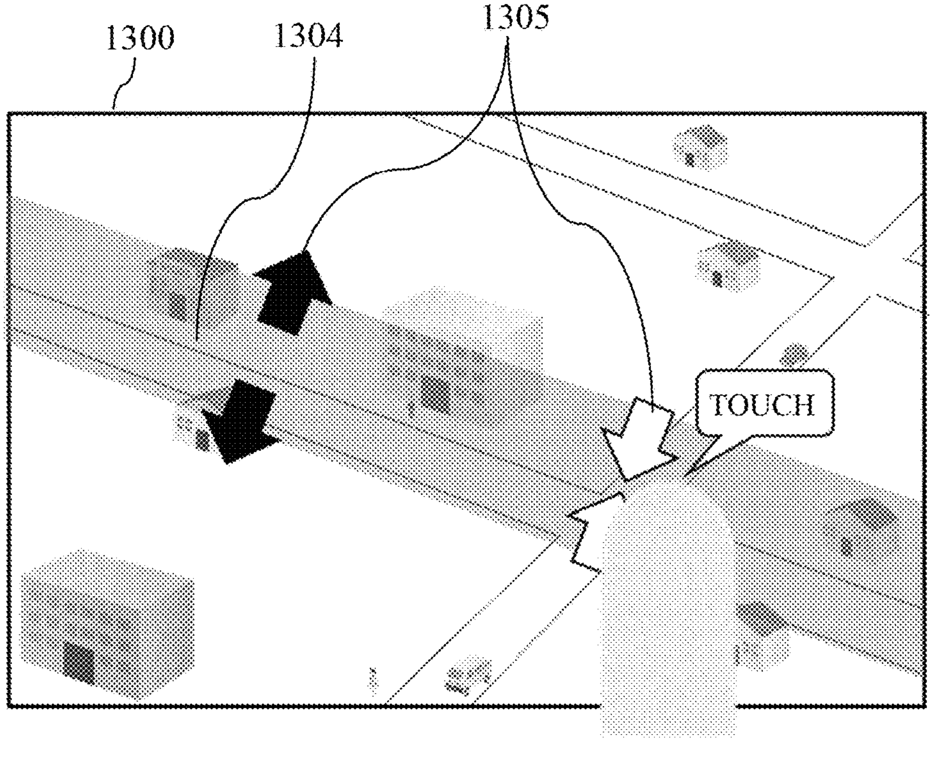
FIG. 7 illustrates a user selecting the in-focus range selector according to the first embodiment.

FIG. 7 illustrates the user selecting the in-focus range selector 1305. The display unit 1108 has a touch operation function, and in a case where the user selects one of the in-focus range selectors 1305 by touching the display unit 1108, the selected selection result is transmitted to the camera CPU 1100. In FIG. 7, narrowing is selected. Since the moving direction of the lens in narrowing the in-focus range is tagged with the determination result, the lens CPU 1000 instructs the lens to move in a predetermined moving direction.

Figure 8:
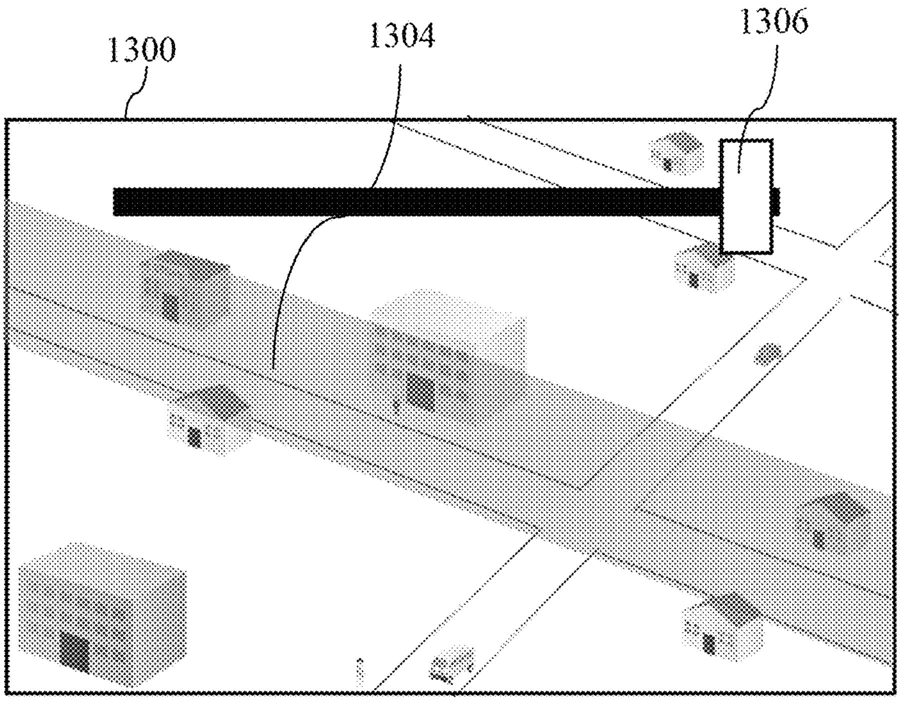
FIG. 8 illustrates an example of an image in which an in-focus range changer according to the first embodiment is displayed.
Figure 9:
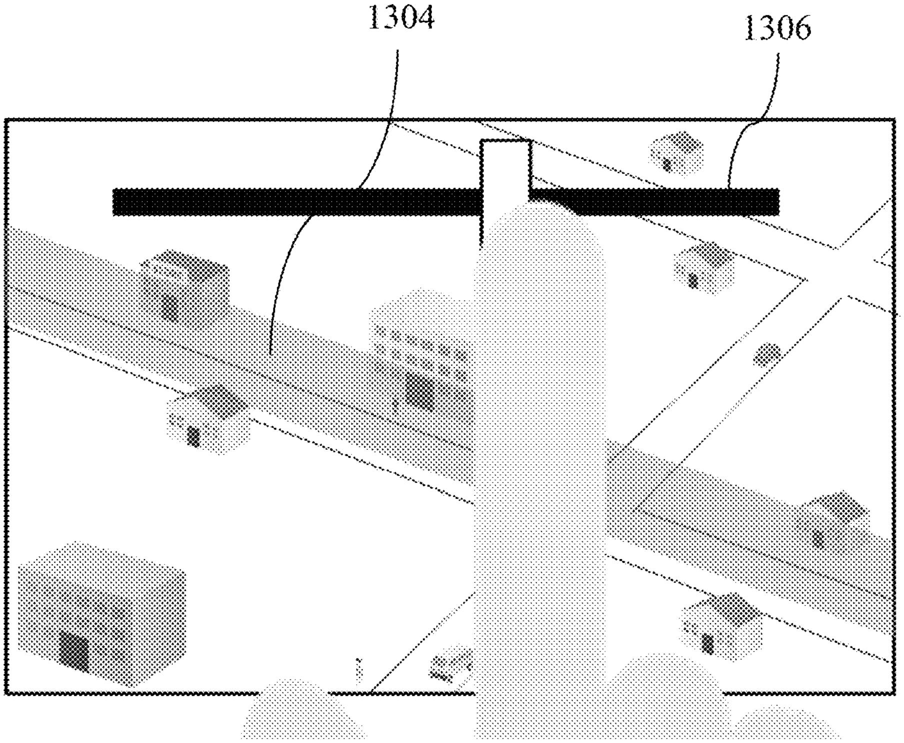
FIG. 9 illustrates a user operating the in-focus range changer according to the first embodiment.

FIG. 8 illustrates an example of an image 1300 in which the in-focus range changer 1306 is displayed. FIG. 9 illustrates a user operating the in-focus range changer 1306. By operating the in-focus range changer 1306, the user can instruct the change amount of the in-focus range. The in-focus range display 1304 changes in accordance with the operation of the in-focus range changer 1306, and the user can specify a desired in-focus range. The instruction signal from the in-focus range changer 1306 is transmitted to camera CPU 1100. Since the necessary lens movement amount is tagged with the change amount instruction in the in-focus range based on the determination result, the lens CPU 1000 instructs the lens to move by a predetermined moving amount.

Due to the above configuration, the user can widen or narrow the in-focus range during tilt imaging without considering the eccentrically moving directions of the sixth lens 026 and the eighth lens 028 or the tilting direction of the object plane 1202*c*.

In this embodiment, the in-focus range selector 1305 and the in-focus range changer 1306 are operated in different operations, but this embodiment is not limited to this example.

For example, a description will now be given of a case of widening or narrowing the in-focus range by moving the sixth lens 026 and the eighth lens 028 using a single operation unit that simultaneously performs the functions of the in-focus range selector 1305 and the in-focus range changer 1306. In this case, the camera CPU 1100 first acquires information regarding an operation unit that is configured such that, for example, a first operation widens the in-focus range and the second operation narrows the in-focus range. Then, the camera CPU 1100 sets so that the moving directions of the sixth lens 026 and the eighth lens 028 become directions for widening the in-focus range in the first operation performed on the operation unit. In addition, the camera CPU 1100 sets so that the moving directions of the sixth lens 026 and the eighth lens 028 can be directions for narrowing the in-focus range in the second operation performed on the operation unit. Here, the operation unit may be a button, a switch, a rotation ring, a touch panel, or the like provided to the lens barrel 001 or the camera body 002, or may be an external device different from the camera system 000. For example, in a case where the operation unit is a button, the first operation is turning on a button indicating widening, and the second operation is turning on a button indicating narrowing. In this case, the operation unit may be configured to increase the moving amounts of the sixth lens 026 and the eighth lens 028 in proportion to the turning-on period. In a case where the operation unit is a switch that can select between widening and narrowing, the first operation is the selection of widening, and the second operation is the selection of narrowing. In this case, the operation unit may be configured to increase the moving amounts of the sixth lens 026 and the eighth lens 028 in proportion to the selection time. In a case where the operation unit is a rotation ring, the first operation is rotation in a first rotation direction, and the second operation is rotation in a second rotation direction opposite to the first rotation direction. In this case, the rotating amounts may correspond to the moving amounts of the sixth lens 026 and the eighth lens 028. In a case where the operation unit is a touch panel that can issue an instruction using a bar configured such that, for example, the operation to the first end is widening and the operation to the second end is narrowing, the first operation is an operation in a first direction and the second operation is an operation in a second direction opposite to the first direction. In this case, a distance from a reference position of the bar to an operated position may correspond to the moving amounts of the sixth lens 026 and the eighth lens 028. In a case where the touch panel supports a multi-touch method that can simultaneously detect the touch of a plurality of fingers, the first operation may be a pinch-out, and the second operation may be a pinch-in.

Second Embodiment

This embodiment will discuss only the configurations that are different from the first embodiment and will omit a description of the configuration common to the first embodiment.

The first embodiment uses a change in clarity of the image 1300 as an example of the determining method, but this embodiment uses another determining method.

The camera system 000 according to this embodiment includes a distance measuring sensor configured to measure a distance to an object (object distance) and acquire distance information, and a focus shift detector configured to detect a focus shift amount based on a position in an output waveform from the distance measuring sensor. Based on the focus shift amount detected by the focus shift detector, it is possible to determine in which directions the sixth lens 026 and the eighth lens 028 are to be eccentrically moved to widen or narrow the in-focus range. The eccentrically moving amounts of these lenses required to change the in-focus range can also be acquired at the same time. Then, based on the result, the moving directions and moving amounts of these lenses can be tagged with the widening or narrowing instruction and the change amount instructed by the user.

In this embodiment, the aperture operation ring 020 functions as an operation ring 1400 to which the user can arbitrarily assign functions. Thereby, the function of the TS instructing unit 1109 can be assigned to the operation ring 1400.

Figure 10:
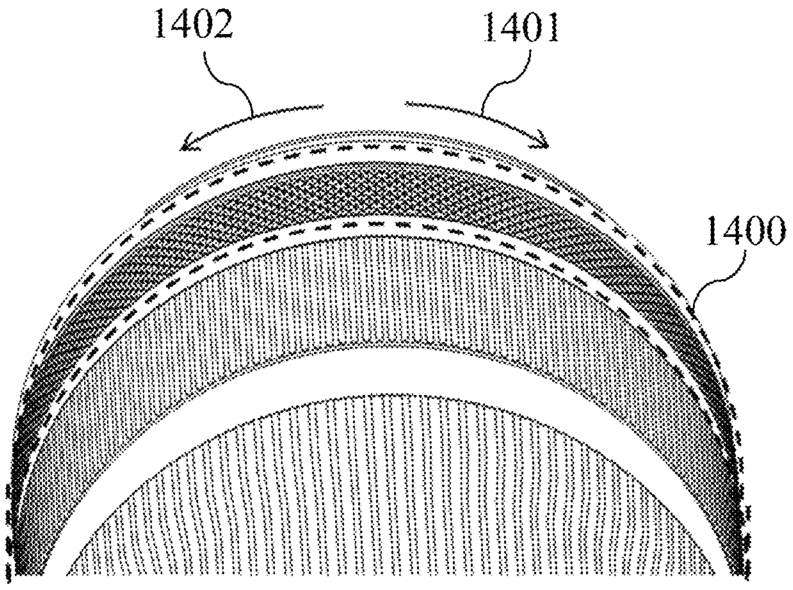
FIG. 10 is a schematic diagram of the operation ring to which the function of the tilt/shift (TS) instructing unit according to a second embodiment is assigned.

FIG. 10 is a schematic diagram of the operation ring 1400 to which the function of the TS instructing unit 1109 according to this embodiment is assigned. The operation ring 1400 is used to select the widening or narrowing of the in-focus range. More specifically, the user instructs the widening of the in-focus range by rotating the operation ring 1400 in a clockwise direction 1401 around the optical axis 004 when viewed from the side of the camera body 002 (image side), and the narrowing of the in-focus range by rotating the operation ring 1400 in a counterclockwise direction 1402. The change amount of the in-focus range can be specified by the rotating amount of the operation ring 1400.

In comparison with the first embodiment, this embodiment can determine the relationship between the moving direction of the tilting optical member and the widening or narrowing of the in-focus range without a fine lens movement.

Due to the above configuration, the user can widen or narrow the in-focus range during tilt imaging without considering the eccentrically moving directions of the sixth lens 026 and the eighth lens 028 or the tilting direction of the object plane 1202*c*.

This embodiment assigns the function of the TS instructing unit 1109 to the operation ring 1400, but is not limited to this example. The function of the TS instructing unit 1109 may be assigned to an operation ring, button, or dial mounted on the lens barrel 001 or the camera body 002, or a dedicated operation unit having the function of the TS instructing unit 1109 may be provided. A separate operating device that can communicate with the camera system 000 may have the function of the TS instructing unit 1109.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide a lens apparatus and an image pickup apparatus, each of which can change an in-focus range with a simple operation.

This application claims priority to Japanese Patent Application No. 2023-071260, which was filed on Apr. 25, 2023, and which is hereby incorporated by reference herein in its entirety.

What is claimed is:

1. A lens apparatus comprising:

an optical member configured to be movable with widening or narrowing of an in-focus range; and a processor configured to:

determine whether the in-focus range is widened or narrowed with respect to a moving direction of the optical member; and set information regarding a movement of the optical member based on a determined result.

2. The lens apparatus according to claim 1, wherein the information includes information on the moving direction of the optical member according to a user operation based on the determined result.

3. The lens apparatus according to claim 1, wherein:

the information includes information on a moving direction of the optical member, and the processor sets the moving direction of the optical member based on:

the determined result that is to widen the in-focus range in a case where a first operation is performed by the user; and the determined result that is to narrow the in-focus range in a case where a second operation is performed by the user.

4. The lens apparatus according to claim 1, further comprising:

a detector configured to detect a focus state, wherein the processor determines whether the in-focus range is widened or narrowed based on the detected focus state.

5. The lens apparatus according to claim 1, further comprising:

detector configured to detect a focus shift amount based on distance information to an object, wherein the processor determines whether the in-focus range is widened or narrowed based on the detected focus shift amount.

6. The lens apparatus according to claim 1, wherein the in-focus range changes according to a rotation of a focal plane.

7. The lens apparatus according to claim 1, wherein the optical member is movable to change at least one of a tilt effect that tilts a focal plane relative to an imaging surface or a shift effect that moves an imaging range.

8. The lens apparatus according to claim 1, wherein the optical member is movable in a direction orthogonal to an optical axis.

9. The lens apparatus according to claim 1, wherein the lens apparatus is attachable to and detachable from an image pickup apparatus.

10. An image pickup apparatus comprising:

an image sensor configured to image through a lens apparatus that includes an optical member configured to be movable with widening or narrowing of an in-focus range; and a processor configured to:

determine whether the in-focus range is widened or narrowed with respect to a moving direction of the optical member; and set information regarding a movement of the optical member based on a determined result.

* * * * *